US010298460B2

(12) United States Patent
Ahmed et al.

(10) Patent No.: US 10,298,460 B2
(45) Date of Patent: May 21, 2019

(54) SYSTEM AND METHOD FOR AGGREGATING COMMUNICATION AND CONTROL OF WIRELESS END-POINTS IN A DATA CENTER

(71) Applicant: Dell Products, LP, Round Rock, TX (US)

(72) Inventors: Sajjad Ahmed, Round Rock, TX (US); Arulnambi Raju, Austin, TX (US); Sudhir V. Shetty, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 449 days.

(21) Appl. No.: 14/976,777

(22) Filed: Dec. 21, 2015

(65) Prior Publication Data

US 2017/0180206 A1 Jun. 22, 2017

(51) Int. Cl.
*G06F 15/16* (2006.01)
*H04L 12/24* (2006.01)
*G06F 15/80* (2006.01)
*H04W 12/00* (2009.01)

(52) U.S. Cl.
CPC .............. *H04L 41/12* (2013.01); *G06F 15/80* (2013.01); *H04W 12/00* (2013.01)

(58) Field of Classification Search
CPC ......... H04L 41/12; G06F 15/80; H04W 12/00
See application file for complete search history.

(56) References Cited

U.S. PATENT DOCUMENTS

| | | |
|---|---|---|
| 5,335,985 A | 8/1994 | Baur |
| 5,434,775 A | 7/1995 | Sims et al. |
| 5,505,533 A | 4/1996 | Kammersgard et al. |
| 5,774,668 A | 6/1998 | Choquier et al. |
| 5,805,442 A | 9/1998 | Crater et al. |
| 5,869,820 A | 2/1999 | Chen et al. |
| 5,910,776 A | 6/1999 | Black |
| 5,913,034 A | 6/1999 | Malcolm |
| 5,926,463 A | 7/1999 | Ahearn et al. |
| 5,956,665 A | 9/1999 | Martinez et al. |
| 5,956,723 A | 9/1999 | Zhu |
| 5,959,012 A | 9/1999 | Simonian et al. |
| 6,057,981 A | 5/2000 | Fish et al. |
| 6,112,246 A | 8/2000 | Horbal et al. |
| 6,131,119 A | 10/2000 | Fukui |
| 6,167,448 A | 12/2000 | Hemphill et al. |
| 6,282,175 B1 | 8/2001 | Steele et al. |
| 6,601,084 B1 | 7/2003 | Bhaskaran et al. |
| 6,654,347 B1 | 11/2003 | Wiedeman et al. |

(Continued)

*Primary Examiner* — Moustafa M Meky
(74) *Attorney, Agent, or Firm* — Larson Newman, LLP

(57) ABSTRACT

A server rack, includes a first system and a second system. The first system includes a host processing complex and a first wireless management system that manages a managed element of the first system out of band from a hosted processing environment instantiated on the first system and that provides a first wireless connection beacon. The second system includes a second wireless management system that receives the first wireless connection beacon and that provides a first indication to the first wireless management system that the second wireless management system received the first wireless connection beacon. The first wireless management system further determines a first location of the second system based upon the first indication.

18 Claims, 15 Drawing Sheets

(56) References Cited

U.S. PATENT DOCUMENTS

| | | | |
|---|---|---|---|
| 6,714,977 B1 | 3/2004 | Fowler et al. | |
| 6,826,714 B2 | 11/2004 | Coffey et al. | |
| 7,450,636 B2 | 11/2008 | Lee et al. | |
| 7,696,506 B2 | 4/2010 | Lung | |
| 7,720,987 B2 | 5/2010 | Penk et al. | |
| 8,031,763 B2 | 10/2011 | Sumesaglam | |
| 8,037,330 B2 | 10/2011 | Livescu et al. | |
| 8,588,288 B2 | 11/2013 | Witt | |
| 8,732,508 B2 | 5/2014 | Cochran et al. | |
| 8,862,067 B2 * | 10/2014 | Un | G01S 5/02 455/67.11 |
| 8,958,795 B2 * | 2/2015 | Tokgoz | H04W 60/04 455/435.1 |
| 9,374,294 B1 * | 6/2016 | Pani | H04L 12/18 |
| 2002/0095487 A1 | 7/2002 | Day et al. | |
| 2002/0141210 A1 | 10/2002 | Glannopoulos et al. | |
| 2003/0046339 A1 | 3/2003 | Ip | |
| 2004/0010649 A1 | 1/2004 | Weaver et al. | |
| 2004/0013188 A1 | 1/2004 | Toniello et al. | |
| 2006/0182172 A1 | 8/2006 | Lin | |
| 2007/0079008 A1 * | 4/2007 | Leibovich | H04L 41/04 709/246 |
| 2007/0094426 A1 | 4/2007 | Chiang et al. | |
| 2008/0304557 A1 | 12/2008 | Hollis | |
| 2008/0317021 A1 | 12/2008 | Ives et al. | |
| 2009/0189774 A1 | 7/2009 | Brundridge et al. | |
| 2009/0217073 A1 | 8/2009 | Brech et al. | |
| 2009/0307515 A1 | 12/2009 | Bandholz et al. | |
| 2010/0027687 A1 | 2/2010 | De Natale et al. | |
| 2010/0106154 A1 | 4/2010 | Harlev et al. | |
| 2010/0289620 A1 * | 11/2010 | Aminger | G06K 7/10405 340/10.1 |
| 2011/0022245 A1 | 7/2011 | Goodrum et al. | |
| 2011/0179301 A1 | 7/2011 | Liu et al. | |
| 2012/0170638 A1 | 7/2012 | Chen | |
| 2012/0262956 A1 | 10/2012 | DeHaven | |
| 2012/0303767 A1 | 11/2012 | Renzin | |
| 2013/0007249 A1 | 1/2013 | Wang et al. | |
| 2013/0169314 A1 | 7/2013 | Choudhary et al. | |
| 2013/0189939 A1 * | 7/2013 | Wang | G06Q 30/02 455/127.1 |
| 2013/0260693 A1 * | 10/2013 | Un | G01S 5/02 455/67.11 |
| 2014/0269881 A1 | 9/2014 | He et al. | |
| 2014/0312953 A1 | 10/2014 | Song | |
| 2015/0031392 A1 * | 1/2015 | Un | G01S 5/02 455/456.1 |
| 2016/0294622 A1 * | 10/2016 | Phillips | H04L 41/0816 |
| 2016/0344641 A1 * | 11/2016 | Javidi | H04L 47/283 |
| 2016/0380834 A1 * | 12/2016 | Peng | H04L 41/12 370/254 |
| 2017/0006576 A1 * | 1/2017 | Barrett | H04W 64/003 |
| 2017/0154005 A1 * | 6/2017 | Ahmed | G06F 13/4081 |
| 2017/0160776 A1 * | 6/2017 | Ahmed | G06F 1/26 |
| 2017/0164077 A1 * | 6/2017 | Goodrum | H04Q 11/0071 |
| 2017/0339585 A1 * | 11/2017 | Cortes | H04W 24/08 |

* cited by examiner

SYSTEM AND METHOD FOR AGGREGATING COMMUNICATION AND CONTROL OF WIRELESS END-POINTS IN A DATA CENTER

FIELD OF THE DISCLOSURE

This disclosure generally relates to information handling systems, and more particularly relates to a system and method for aggregating communication and control of wireless end-points in a data center.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
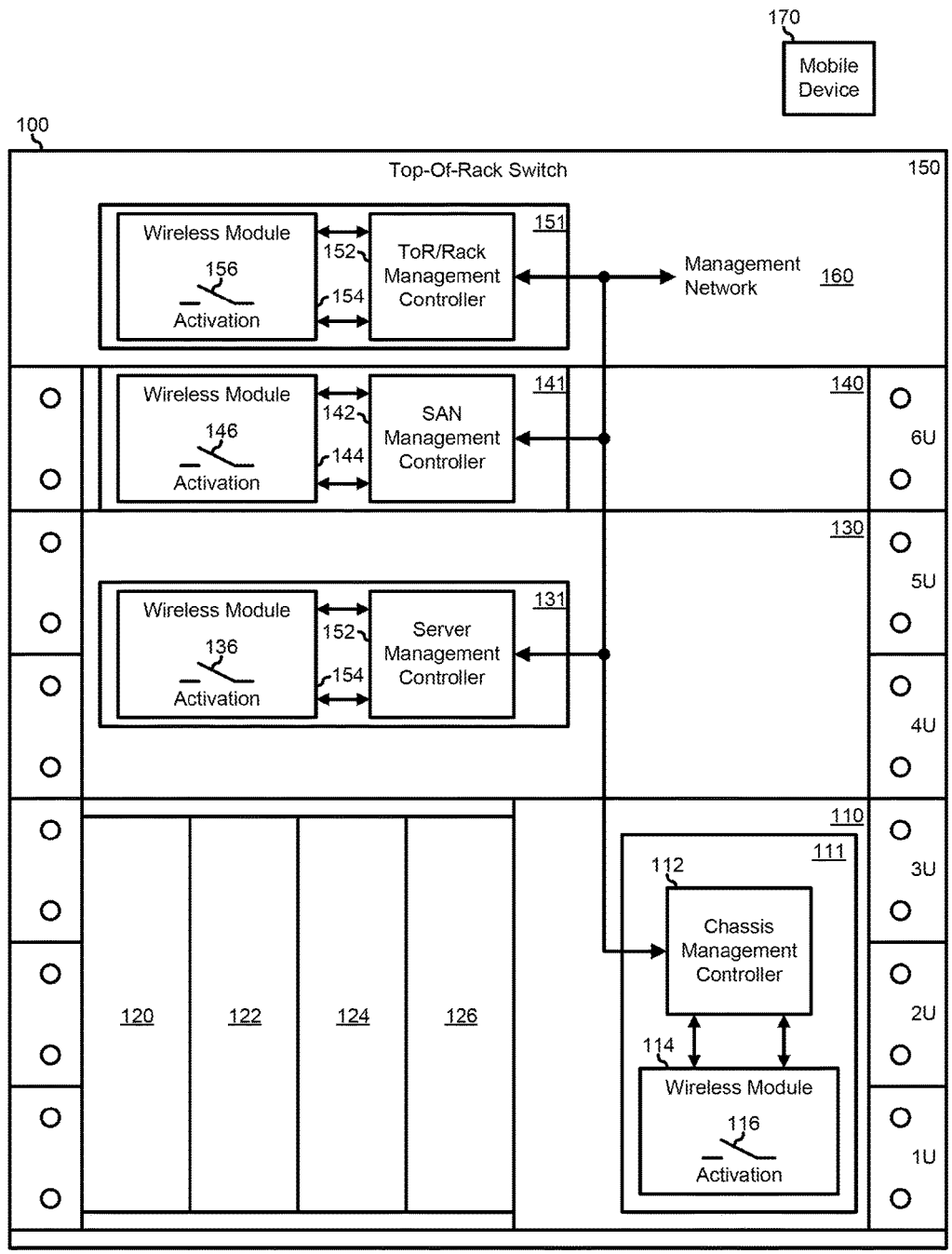
FIG. 1 is a view of a server rack according to an embodiment of the present disclosure.

FIG. 1 illustrates an embodiment of a server rack 100 including a blade chassis 110, a server 130, and storage 140 situated in a rack space of the server rack, and a top-of-rack (ToR) switch 150 at the top of the server rack. The rack space represents a standard server rack, such as a 19-inch rack equipment mounting frame or a 23-inch rack equipment mounting frame, and includes rack units, or divisions of the rack space that are a standardized unit of 1.75 inches high. For example, a piece of equipment that will fit an one of the rack units is referred to as a 1-U piece of equipment, another piece of equipment that takes up two of the rack units is referred to as a 2-U piece of equipment, and so forth. As such, the rack units are numbered sequentially from the bottom to the top as 1U, 2U, 3U, 4U, 5U, and 6U. The skilled artisan will recognize that other configurations for the rack units can be utilized as needed or desired. For example, a rack unit can be defined by the Electronic Components Industry Association standards council.

Blade chassis 110 represents a processing system of server rack 100 that is configured as a number of modular processing resources, or blades, that are provided in a common frame (i.e., the chassis). As such, blade chassis 110 includes server blades 120, 122, 124, and 126. Server 130 represents another processing system of server rack 100 that is configured as an individual processing resource. Storage 140 represents a data storage capacity of server rack 100 that provides a number of disk drives that are configured to the use of blade chassis 110 and of server 130, and can include other type of storage resource for server rack 100.

ToR switch 110 represents a network system of server rack 100, providing for high speed communications between blade chassis 110, server 130, storage 140, and a network (not illustrated). In particular, ToR switch 150 is connected to blade chassis 110, server 130, and storage 140 via a network fabric (not illustrated), to provide data routing between the elements.

Each element of server rack 100 includes a management system having a management controller and a wireless management module. As such, blade chassis 110 includes a chassis management system 111 with a chassis management controller 112 and a wireless management module 114, server 130 includes a server management system 131 with a server management controller 132 and a wireless management module 134, storage 140 includes a storage management system 111 with a storage management controller 142 and a wireless management module 144, and ToR switch 150 includes a ToR management system 151 that includes a ToR management controller 152 and a wireless management module 154. Each of wireless management modules 114, 134, 144, and 154 include a respective activation switch 116, 136, 146, and 156, and respective indicators 118, 138, 148, and 158, described further, below.

Management systems 111, 131, 141, and 151 are connected together via a management network 160 to provide for out-of-band monitoring, management, and control of the respective elements of server rack 100. For example, management systems 111, 131, 141, and 151 can provide system monitoring functions, such as temperature monitoring, power supply monitoring, physical intrusion monitoring, hot-swap and hot-plug monitoring, other monitoring functions that can be performed outside of a hosted environment of the respective elements of server rack 100, or other system monitoring functions as needed or desired. Management systems 111, 131, 141, and 151 can also provide system management and control functions for the respective elements of server rack 100, such as cooling fan speed control, power supply management, hot-swap and hot-plug management, firmware management and update management for system BIOS or UEFI, Option ROM, device firmware, and the like, or other system management and control functions as needed or desired. As such, management controllers 112, 132, 142, and 152 represent embedded controllers associated with the respective elements of server rack 100 that operate separately from a hosted processing environment of the respective elements. For example, management controllers 112, 132, 142, and 152 can include a baseboard management controller (BMC), an Integrated Dell Remote Access Controller (IDRAC), or another type of management controller as needed or desired. Further, management controllers 112, 132, 142, and 152 can operate in accordance with an Intelligent Platform Management Interface (IPMI) specification, a Web Services Management (WSMAN) standard, or another interface standard for embedded management systems, as needed or desired. The skilled artisan will recognize that management controllers 112, 132, 142, and 152 can include other circuit elements, devices, or sub-systems, such as an embedded controller, a logic device such as a Programmable Array Logic (PAL) device, a Complex Programmable Logic Device (CPLD), a Field-Programmable Gate Array (FPGA) device, or the like, multiplexors, and other devices as needed or desired to provide the functions and features as described herein.

Wireless management modules 114, 134, 144, and 154 operate to provide wireless connectivity between a user with a wireless enabled mobile device 170 and management network 160 through the respective management controllers 112, 132, 142, and 152. For example, wireless management modules 114, 134, 144, and 154 can include WiFi wireless interfaces in accordance with one or more IEEE 802.11 specifications for high-speed data communication between mobile device 170 and the wireless management modules, at speeds of up to 30 mega-bits per second (MBPS) or more. Wireless management modules 114, 134, 144, and 154 can also include Bluetooth wireless interfaces in accordance with one or more Bluetooth specifications, including Bluetooth Low Energy (BLE), also known as Bluetooth Smart (BTS), for lower-speed communications at speeds of up to 150 kilo-bits per second (Kbps) or more.

Wireless management modules 114, 134, 144, and 154 include various security features to ensure that the connection between mobile device 170 and management network 160 is secure and that the user of the mobile device is authorized to access the resources of the management network. In particular, wireless management modules 114, 134, 144, and 154 operate to provide various WiFi user and device authentication schemes, such as schemes that are in accordance with one or more IEEE 802.11 specifications, Service Set Identification (SSID) hiding, Media Access Control Identification (MAC ID) filtering to allow only pre-approved devices or to disallow predetermined blacklisted devices, Static Internet Protocol (IP) addressing, Wired Equivalent Privacy (WEP) encryption, WiFi Protected Access (WPA) or WPA2 encryption, Temporary Key Integrity Protocol (TKIP) key mixing, Extensible Authentication Protocol (EAP) authentication services, EAP variants such as Lightweight-EAP (LEAP), Protected-EAP (PEAP), and other standard or vendor specific user and device authentication schemes, as needed or desired. Further, wireless management modules 114, 134, 144, and 154 operate to provide various Bluetooth device and service authentication schemes, such as a Security Mode 2 service level-enforced security mode that may be initiated after link establishment but before logical channel establishment, a Security Mode 3 link level-enforced security mode that may be initiated before a physical link is fully established, a Security Mode 4 service level-enforced security mode that may be initiated after link establishment but before logical channel establishment and that uses a Secure Simple Pairing (SSP) protocol, or other device or service authentication schemes, as needed or desired.

In a particular embodiment, wireless management modules 114, 134, 144, and 154 also provide additional security features that further assure the user, device, and service security of the connection between mobile device 170 and management network 160. In particular, wireless management modules 114, 134, 144, and 154 each include an activation switch 116, 136, 146, and 156, respectively, that operate to enable the establishment of the connection between the mobile device and the wireless management modules. In this way, the establishment of the connection between mobile device 170 and wireless management modules 114, 134, 144, and 154 is predicated on the physical proximity of a user and of the user's mobile device to server rack 100, and also upon an action indicating a request to establish the connection. Here, a remote device and user would not be able to initiate an attack on management network 160 because of the lack of physical proximity to server rack 100 to activate activation switches 116, 136, 146, or 156, and so any attempt to attack management network would have to wait at least until a service technician activated one of the activation switches. In another embodiment, one or more of wireless management modules 114, 134, 144, and 154 and mobile device 170 operate to detect a Received Signal Strength Indication (RSSI) or a Received Channel Power Indication (RCPI) to permit the determination of the proximity between the mobile device and the wireless management modules, as described further, below. In a particular embodiment, one or more of wireless management modules 114, 134, 144, and 154 does not include an activation switch, and the particular wireless management modules provide for the establishment of the connection between the mobile device the wireless management modules in response to another activation request from the mobile device.

The elements of server rack 100, blade chassis 110, server 130, storage 140, and ToR switch 150 are exemplary, and more or fewer elements can be considered to be included in the server rack as needed or desired, and that other types of elements can be included in the server rack as needed or desired. Further, the management network of server rack 100 can include management controllers associated with more or fewer elements or different types of elements, and needed or desired.

Figure 2:
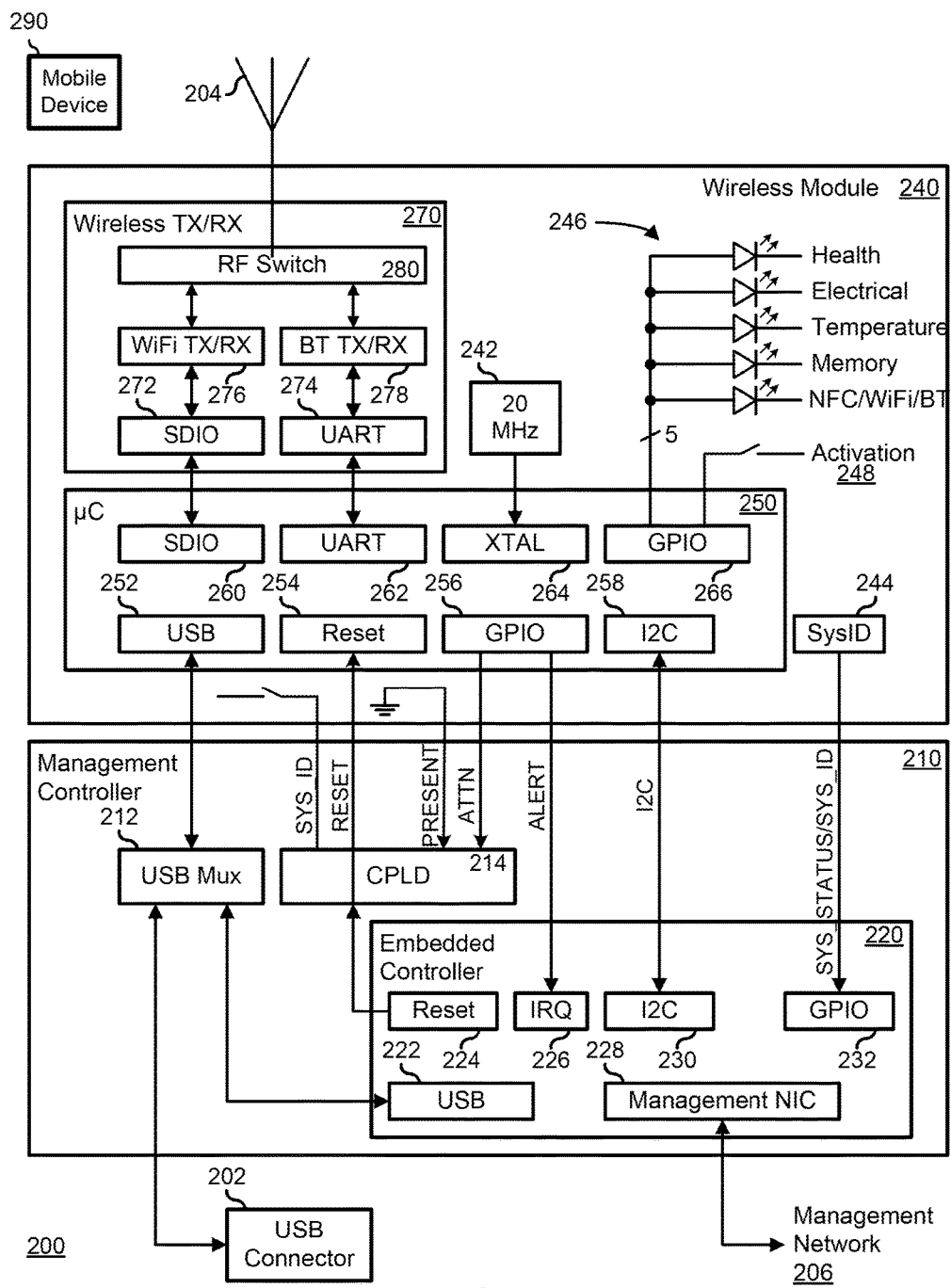
FIG. 2 is a block diagram illustrating a management system of the server rack of FIG. 1.

FIG. 2 illustrates a management system 200 similar to management systems 111, 131, 141, and 151, and includes a management controller 210 that is similar to management controllers 112, 132, 142, and 152, a wireless management module 240 similar to wireless management modules 114, 134, 144, and 154, a USB connector 202, a wireless device antenna 204, and a connection to a management network 206. Management controller 210 includes a USB multiplexor 212, a CPLD 214, and an embedded controller 220. Embedded controller 220 includes a USB interface 222, a reset function output 224, an interrupt request input 226, a management network interface device (NIC) 228, an Inter-Integrated Circuit (I2C) interface 230, and a General Purpose I/O (GPIO) 232.

Wireless management module 240 includes a 20 megahertz (MHz) crystal 242, a system ID module 244, indicators 246, an activation switch 248, a micro-controller 250, and a wireless transceiver module 270. Micro-controller 250 includes a USB interface 252, a reset function input 254, GPIOs 256 and 266, an I2C interface 258, a Secure Digital I/O (SDIO) interface 260, a Universal Asynchronous Receiver/Transmitter (UART) 262, and a crystal input 264. Wireless transceiver module 270 includes and SDIO interface 72, a UART 274, a WiFi transceiver 276, a Bluetooth transceiver 278, and a Radio Frequency (RF) switch 280. Management controller 210 and wireless management module 240 will be understood to include other elements, such as memory devices, power systems, and other elements as needed or desired to perform the operations as described herein. In a particular embodiment, wireless management module 240 is configured as a pluggable module that can be installed into management system 200, or not, as needed or desired by the user of a rack system that includes the management system. The skilled artisan will recognize that other configurations can be provided, including providing one or more element of management controller 210 or wireless management module 240 as a pluggable module, as elements on a main board of management system 200, or as integrated devices of the management system.

USB multiplexor 212 is connected to USB connector 202, and USB interfaces 222 and 252 to make a selected point-to-point USB connection. For example, a connection can be made between a USB device plugged in to USB connector 202 and embedded controller 220 by connecting the USB connector to USB interface 222. In this way, a device plugged in to USB connector 202 can access the management functions and features of the information handling system that is managed by management controller 210, and can access management network 206. Alternatively, a connection can be made between a USB device plugged in to USB connector 202 and micro-controller 250 by connecting the USB connector to USB interface 252. In this way, a device plugged in to USB connector 202 can access the management functions and features of wireless management module 240. For example, a technician in a data center can connect a laptop device to USB connector 202, configure USB multiplexor 212 to make a point-to-point connection to USB interface 252, and provide a firmware update for wireless management module 240. Finally, a connection can be made between embedded controller 220 and micro-controller 250 by connecting USB interface 222 to USB interface 222. In this way, a mobile device 290 that has established a wireless connection to wireless management module 240 can access the management functions and features of the information handling system that is managed by management system 200, the mobile device can access management network 206, and the management network can be used to access the management functions and features of the wireless management module or to provide a firmware update for the wireless management module. USB connector 202, USB multiplexor 212, and USB interfaces 222 and 252 can be configured in accordance with the USB Standard Revision 3.1, or with another USB Standard Revision, as needed or desired. In updating the firmware of wireless management module 240, micro-controller 250 operates to provide version retrieval, fail-safe updating, signature validation, and other operations needed or desired to perform the firmware update of the wireless management module. In a particular embodiment, management controller 210 does not include USB multiplexor 212, and USB interfaces 222 and 252 are directly connected together.

CPLD 214 represents a logic device for implementing custom logic circuitry to interface between various off-the-shelf integrated circuits, and particularly between embedded controller 220 and micro-controller 250. In particular, CPLD 214 operates to receive a system identification input (SYS_ID) from wireless management module 240, to receive the reset signal from reset function output 224, to forward the reset signal to reset function input 254, to receive a module present (PRESENT) signal from the wireless management module, and to receive an interrupt (INT) signal from GPIO 256. The SYS_ID can be provided based upon one or more settings, such as jumper settings, fusible links, register settings, or other settings, as needed or desired. In another embodiment, one or more functions of CPLD 214 is provided by embedded controller 220, or by micro-controller 250, as needed or desired.

Embedded controller 220 represents an integrated device or devices that is utilized to provide out-of-band management functions to the information handling system that includes management system 200, and can include a BMC, an IDRAC, or another device that operates according to the IPMI specification. In particular, embedded controller 220 operates to receive an interrupt alert (ALERT) signal from GPIO 258 on interrupt request input 230, to send and receive information between I2C 230 and I2C 258, and to receive system status information and system identification information (SYS_STATUS/SYS_ID) from system ID module 244.

Micro-controller 250 represents an embedded controller that operates to control the functions and features of wireless module 240, as described further, below. Micro-controller 250 operates to send and receive information between SDIO interface 260 and SDIO interface 272, to send and receive information between UART 262 and UART 274, to receive a crystal clock signal input from crystal 242, to provide control outputs from GPIO 266 to indicators 246, and to receive an activation input from activation switch 248 at GPIO 266. Indicators 246 provide visual indications of various statuses for wireless management module 240, including a health indication, a electrical/power indication, a temperature indication, a memory status indication, and a radio status indication that identifies the type of a mobile device that is connected to wireless management module, such as a WiFi device, a Bluetooth device, or a Near Field Communication (NFC) device. In a particular embodiment, micro-controller 250 provides other modes of communication between management controller 210 and wireless transceiver module 270, as needed or desired.

Wireless transceiver module 270 represents a mixed-signal integrated circuit device that operates to provide the radio signal interface to a mobile device 290 and to provide data interfaces to micro-controller 250. As such, wireless transceiver module 270 includes a WiFi channel that includes SDIO interface 272 and WiFi transceiver 276, and a Bluetooth channel that includes UART 274 and Bluetooth transceiver 278 that each are connected to RF switch 280. RF switch 280 switches antenna 204 to selectively provide WiFi communications or Bluetooth communications to mobile device 290. In a particular embodiment, wireless transceiver module 270 represents an off-the-shelf device to provide WiFi and Bluetooth wireless communications with mobile device 290.

Management controller 210 operates to provide management and configuration of wireless management module 240, such as by providing firmware updates, SSID configuration, WEP or WPA2 passwords, and the like. In interfacing with management controller 210, wireless management module 240 is represented as a composite USB device, and is connected as two different devices to the management controller. In operating with a WiFi connected mobile device, such as mobile device 290, management controller 210 instantiates a USB class NIC device driver, and the management controller treats the wireless management module in accordance with an Ethernet Remote Network Driver Interface Specification (RNDIS), a USB Communication Device Class (CDC) device, a USB NIC, or another USB network class device. Thus, as viewed from management controller 210, wireless management module 240 operate as a USB NIC, and as viewed from mobile device 290 the wireless management module operates as a WiFi class device, as described further below.

In operating with a Bluetooth connected mobile device, such as mobile device 290, management controller 210 acts as a Bluetooth Host Controller, using a Host Controller Interface (HCI) protocol to communicate with wireless management module 240 via a serial port (UART). In another embodiment, wireless management module 240 is viewed by management controller 210 as a Bluetooth dongle. Thus, as viewed from management controller 210, wireless management module 240 operate as a USB CDC, and as viewed from mobile device 290 the wireless management module operates as a Bluetooth device, as described further below.

Wireless management module 240 operates to deactivate one or more of the WiFi stack and the Bluetooth stack in response to a timeout event. As such, micro-controller 250 can include a timer that determines if a connected device has gone dormant or otherwise ceased to interact with management system 200, such as when mobile device 290 has moved out of range of wireless management module 240. Here, wireless management module 240 can suspend the connected session with the mobile device, and no new session will be initiated until activation switch 248 is activated to indicate that a new session is requested. For example, when a user who is connected using mobile device 290 with management system 200, but subsequently walks away from a server rack that includes the management system, wireless management module 240 can automatically detect the time that the connection is idle, and, after a predetermined duration, can shut down the connection and suspend all wireless activity until a new session is requested. Further, wireless management module 240 operates such that a selected one or both of the WiFi stack and the Bluetooth stack can be disabled. In a particular embodiment, wireless management module 240 operates to configure the transmission power level of the WiFi channel and of the Bluetooth channel.

Mobile device 290 represents a wireless communication enabled device, such as a tablet device, a laptop computer, a smart phone, and the like, that is configured to interact with management system 200 via a wireless connection to wireless management module 240. In particular, mobile device 290 can include a mobile operating system (OS), such as an Android OS, an iOS, a Windows mobile OS, or another mobile OS that is configured to operate with the hardware of the mobile device. As such, the hardware of mobile device 290 can include Android-enabled hardware, iOS-enabled hardware, Windows-enabled hardware, or other hardware, as needed or desired.

Figure 3:
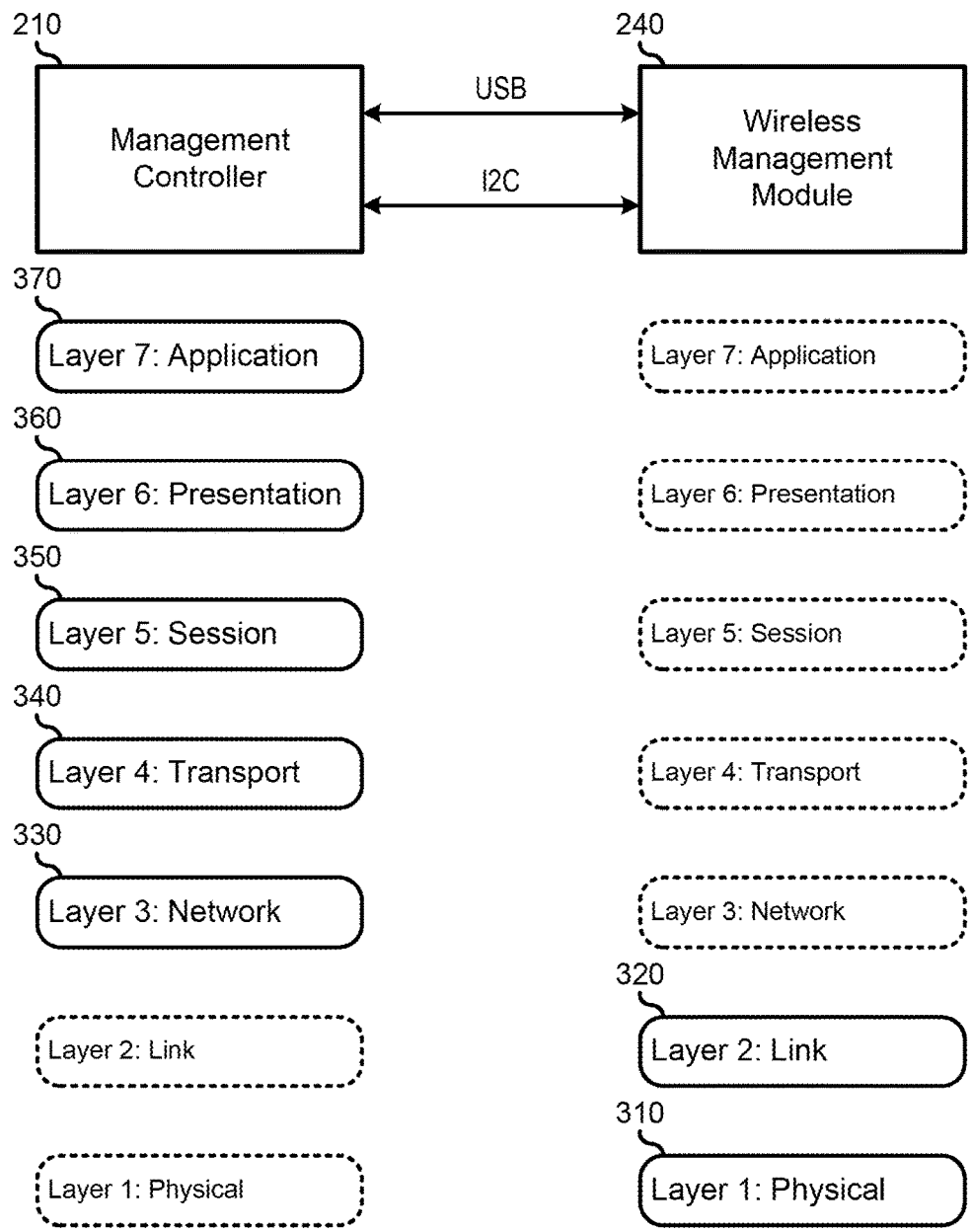
FIG. 3 is an illustration of an OSI layer arrangement of the management system of FIG. 2.

FIG. 3 illustrates management system 200, including the stack up of an Open Systems Interconnection (OSI) communication model layer arrangement for the management system. Here, the physical layer (L1) 310 and the link layer (L2) 320 are included in the functionality of wireless management module 240, and the network layer (L3) 330, the transport layer (L4) 340, the session layer (L5) 350, the presentation layer (L6) 360, and the application layer (L7) 370 are included in management controller 210.

Figure 4:
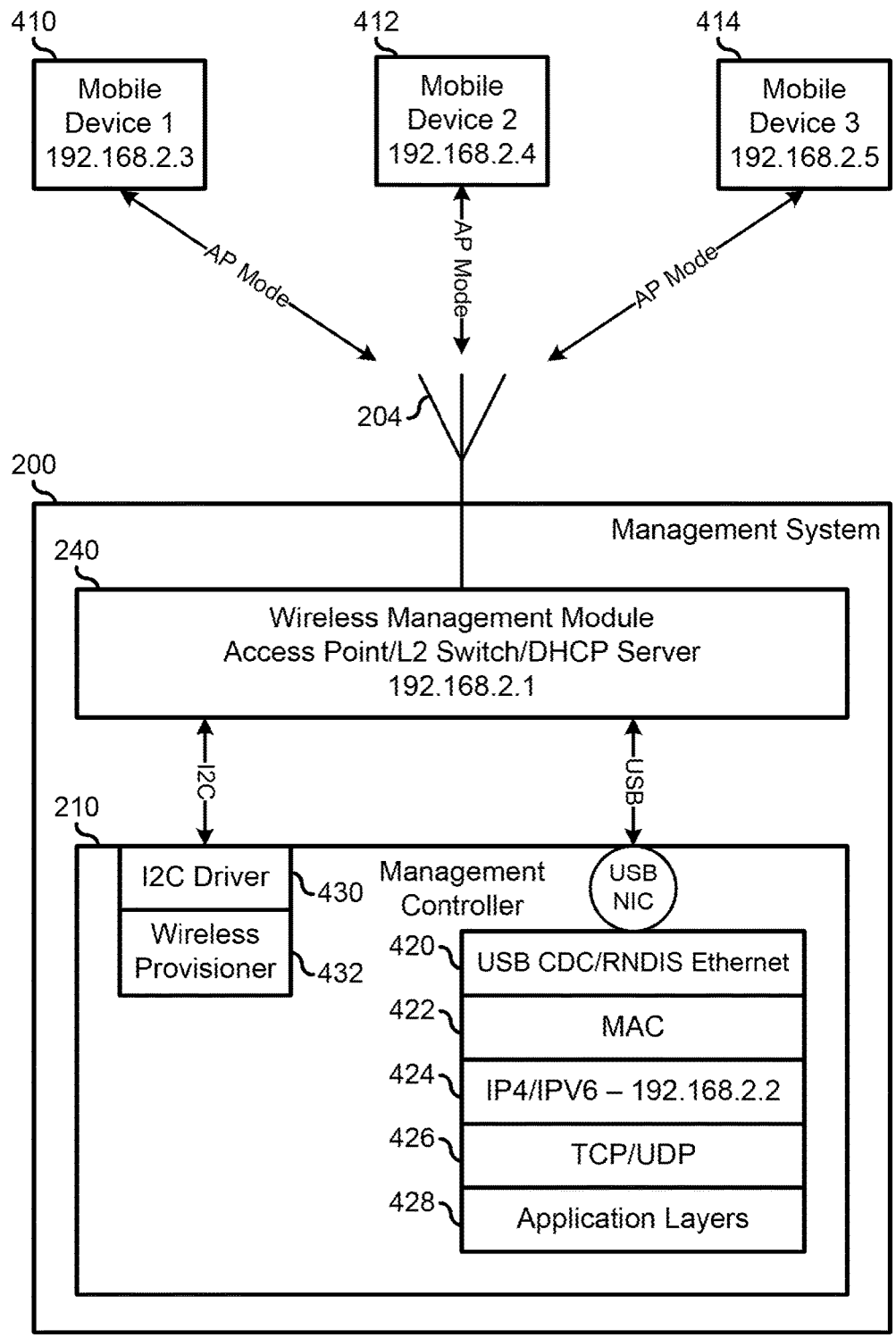
FIGS. 4 and 5 are block diagrams of various embodiments of wireless WiFi-based management networks on the management system of FIG. 2.

FIG. 4 illustrates an embodiment of a wireless WiFi-based management network 400 on management system 200. Here, wireless management module 240 presents itself to management controller 210 as a USB NIC functionality, and the management controller is illustrated as providing a USB NIC functionality by including a USB CDC/RNDIS Ethernet driver 420, a MAC address 422, an IP address 424 (192.168.2.2), a Transmission Control Protocol (TCP) and User Datagram Protocol (UDP) layer 426, and an application layer 428. Management controller 210 is also illustrated as providing an I2C interface including an I2C driver 430 and a wireless provisioner 432. Note that the IP address can be an IP version 4 (IP4) address, as illustrated, or an IP version 6 (IPV6) address, as needed or desired. Wireless management module 240 operates independently from management controller 210 in establishing and maintaining WiFi-based management network 400.

In establishing WiFi-based management network 400, wireless management module 240 is configured as a wireless access point that allows multiple mobile devices to be connected to management system 200. As such, management system 200 is illustrated as being connected with mobile devices 410, 412, and 414. Wireless management module 240 provides WiFi security functionality to mobile devices 410, 412, and 414, such as by screening the WIFI SSID so that only mobile devices that are aware of the existence of the wireless management module can be provide a request to be connected, by providing a key secured establishment of the connection, by encrypting communications between the mobile devices and the wireless management module using WEP, WPA, WPA2, or another encryption protocol, by providing other security assurance functions and features, or a combination thereof.

In addition, wireless management module 240 operates as a Dynamic Host Configuration Protocol (DHCP) host that provides a unique IP address to connected mobile devices 410, 412, and 414, the wireless management module can establish the connections with the mobile devices based upon static IP addresses of the mobile devices, or the wireless management module can provide a sub-network using a combination of DHCP-provided IP addresses and static IP addresses, as needed or desired. Further, wireless management module 240 views management controller 210 as a separate IP endpoint and can provide the management controller with a DHCP-provided IP address or the management controller can include a static IP address as needed or desired. In another embodiment, management controller 210 operates as a DHCP host that provides IP addresses to connected mobile devices 410, 412, and 414. In a particular embodiment, the DHCP host operates in accordance with the DHCPv6 specification, in a stateless auto-configuration mode, or another IP protocol.

Further, wireless management module 240 operates as a Layer-2 switch that redirects packets on the sub-network to the targeted endpoints. As such, mobile devices 410, 412, and 414, wireless management module 240, and management controller 210 can communicate with each other on the sub-network provided by the wireless management module. Also, wireless management module 240 operates to distribute gateway information to mobile devices 410, 412, and 414, and to management controller 210. Further, wireless management module 240 supports blacklisting and whitelisting of specific IP addresses that request access to management system 200.

In a particular embodiment, management controller 210 operates to provide various configuration information to wireless management module 240 via wireless provisioner 432, which tunes and controls the behavior of the wireless management module over the I2C bus. As such, management controller 210 can provide SSIDs, security keys, gateway addresses, and other configuration information, to wireless management module 240 via one of USB interfaces 212 and 252, and I2C interfaces 230 and 258. Here, because USB interfaces 212 and 252 and I2C interfaces 230 and 258 are within a server rack, and thus are deemed to be secure, wireless management module 240 does not need to employ additional security measures in accepting such configuration information from management controller 210. In another embodiment, wireless management module 240 receives the various configuration information from one or more of mobile devices 410, 412, and 414. Here, because a connection between wireless management module 240 and mobile devices 410, 412, and 414 is less secure than the connection to management controller 210, the wireless management module includes a management mode that is accessed via additional security and authentication functions and features in order to ensure that the users of the mobile devices are authorized to make such configuration modifications. For example, the management mode can be accessed via an additional username and password verification, via a hardware device authentication, or another mechanism for providing security and authentication, as needed or desired. In another embodiment, communications between management controller 210 and wireless management module 250 is conducted by other communication interfaces than USB interfaces 212 and 252, and I2C interfaces 230 and 258, as needed or desired.

A method of providing WiFi-based management network 400 on management system 200 includes powering on the management system, and determining that wireless management module 240 is installed into the management system. If wireless management system 240 is installed, then management controller 210 issues a DHCP request to connect to the access point that is established on the wireless management module. Wireless management module 240 assigns an IP address (192.168.2.2) to management controller 210 that is in the same sub-network as the access point (192.168.2.1). Next, mobile device 410 issues a DHCP request to connect to the access point and wireless management module 240 assigns an IP address (192.168.2.3) to the mobile device. Similarly, mobile devices 412 and 414 issue DHCP requests to connect to the access point and wireless management module 240 assigns IP addresses (192.168.2.4 and 192.168.2.5) to the mobile devices. In this way, management controller 210, wireless management module 240, and mobile devices 410, 412, and 414 can communicate over the sub-network with each other.

Figure 5:
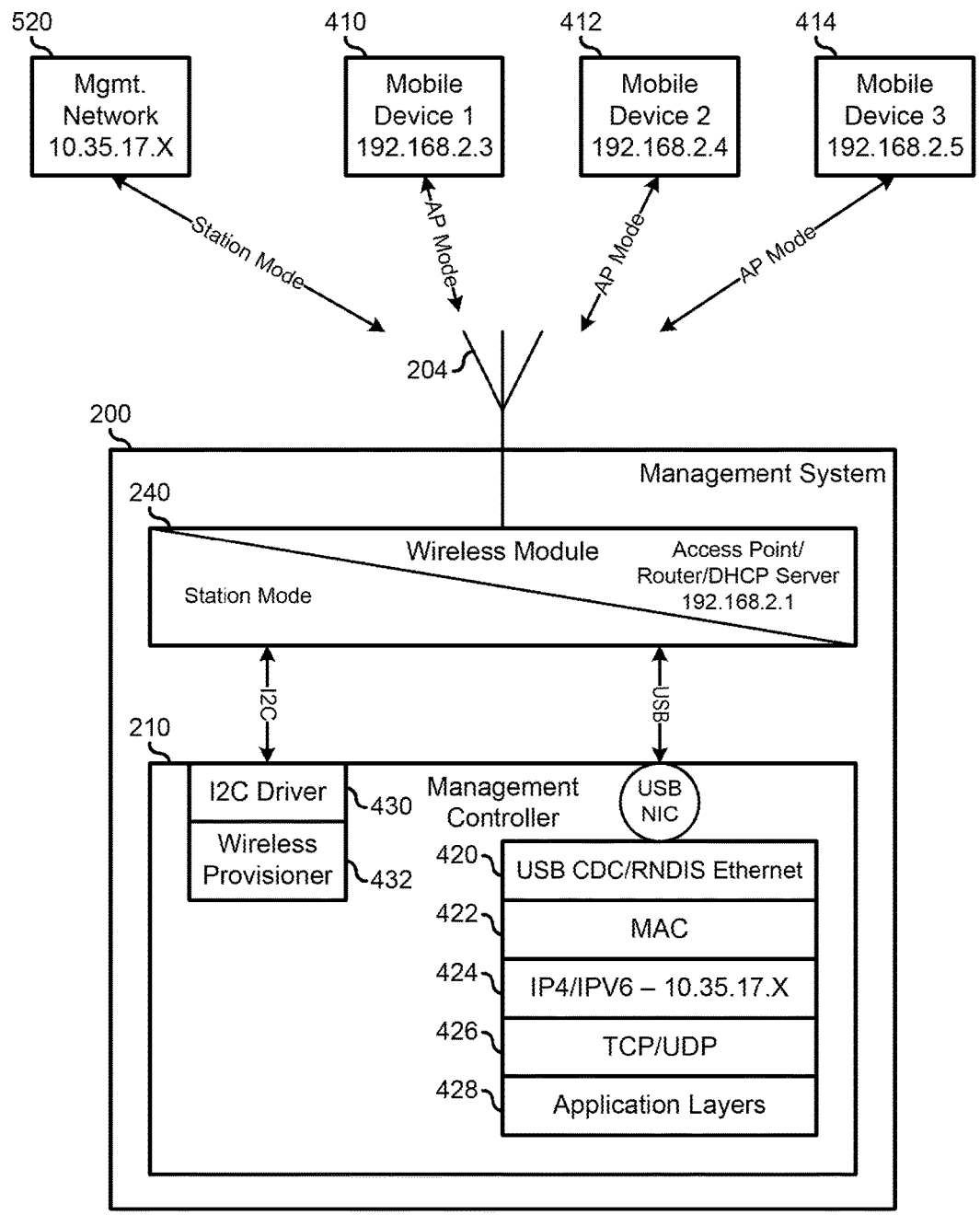

FIG. 5 illustrates another embodiment of a wireless-based management network 500 on management system 200. WiFi based management network 500 includes the functions and features of WiFi based management network 400, where wireless management module 240 operates in an access point mode to form a sub-network with mobile devices 410, 412, and 414. In addition to establishing WiFi-based management network 400, wireless management module 240 is configured as a wireless base station that permits the wireless management module to connect to a wireless management network 520 on a different sub-network. In the wireless base station mode, wireless management module 240 operates as a wireless client to wireless management network 520, such that the wireless management module operates to provide a DHCP request and authentication credentials to the wireless management network, and is authenticated by the wireless management network. Here, wireless management module 240 operates as a router that permits mobile devices 410, 412, and 414, and management controller 210 to communicate with wireless management network 520. In another embodiment, management controller 210 operates as the router, as needed or desired.

In a particular embodiment, management controller 210 is established as a node on wireless management network 520. Here, in one case, management controller 210 can be initially connected to, and established as a node on management network 520 through wireless management module 240, and then the wireless management module can establish the access point sub-network with mobile devices 410, 412, and 414. In another case, wireless management module 240 can establish the access point sub-network with mobile devices 410, 412, and 414, and management controller 210, as described above. Then, management controller 210 can perform a USB disconnect and a USB reconnect to wireless management module 240, and can send a DHCP request and authentication credentials to wireless management network 520 to obtain an IP address that is on the sub-network of the wireless management network.

A method of providing WiFi-based management network 500 on management system 200 includes the method for providing WiFi-based management network 400, as described above. After management controller 210, wireless management module 240, and mobile devices 410, 412, and 414 are established on the first sub-network, the management controller directs the wireless management module 240 to operate in a concurrent access point and base station mode. Wireless management module 240 then disconnects from the USB interface and reconnects to the USB interface with management module 210, and the management module sends SSID and authentication information to the wireless management module. Wireless management module 240 then sends a DHCP request and the authentication information to wireless management network 520. Wireless management network 520 sends an IP address (10.35. 17.X) to management controller 210 and authenticates the management controller onto the new sub-network. Here, because wireless management module 240 operates as a router, mobile devices 410, 412, and 414 can also communicate with wireless management network 520.

Figure 6:
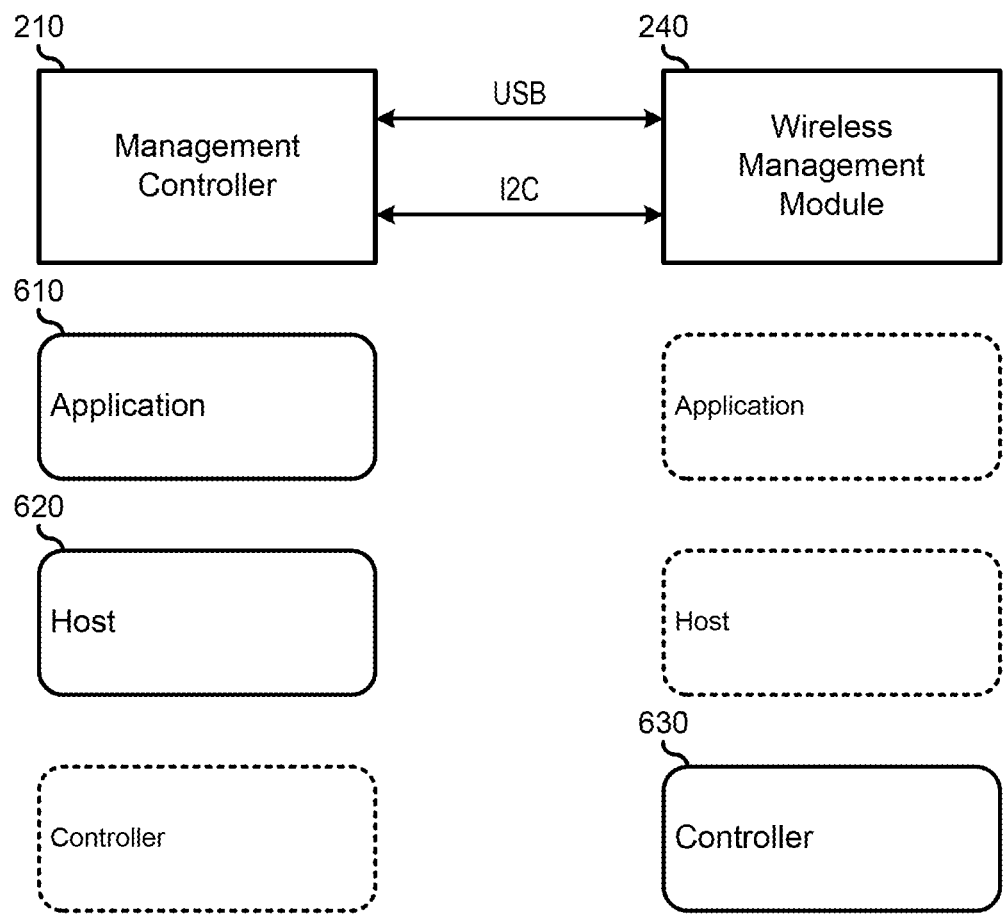
FIG. 6 is an illustration of a Bluetooth stack arrangement of the management system of FIG. 2.

FIG. 6 illustrates management system 200, including the stack up of a Bluetooth communication arrangement for the management system. Here, the application 610 and the host 620 are included in the functionality of management controller 210, and the controller 630 is included in the functionality of wireless management module 240.

Figure 7:
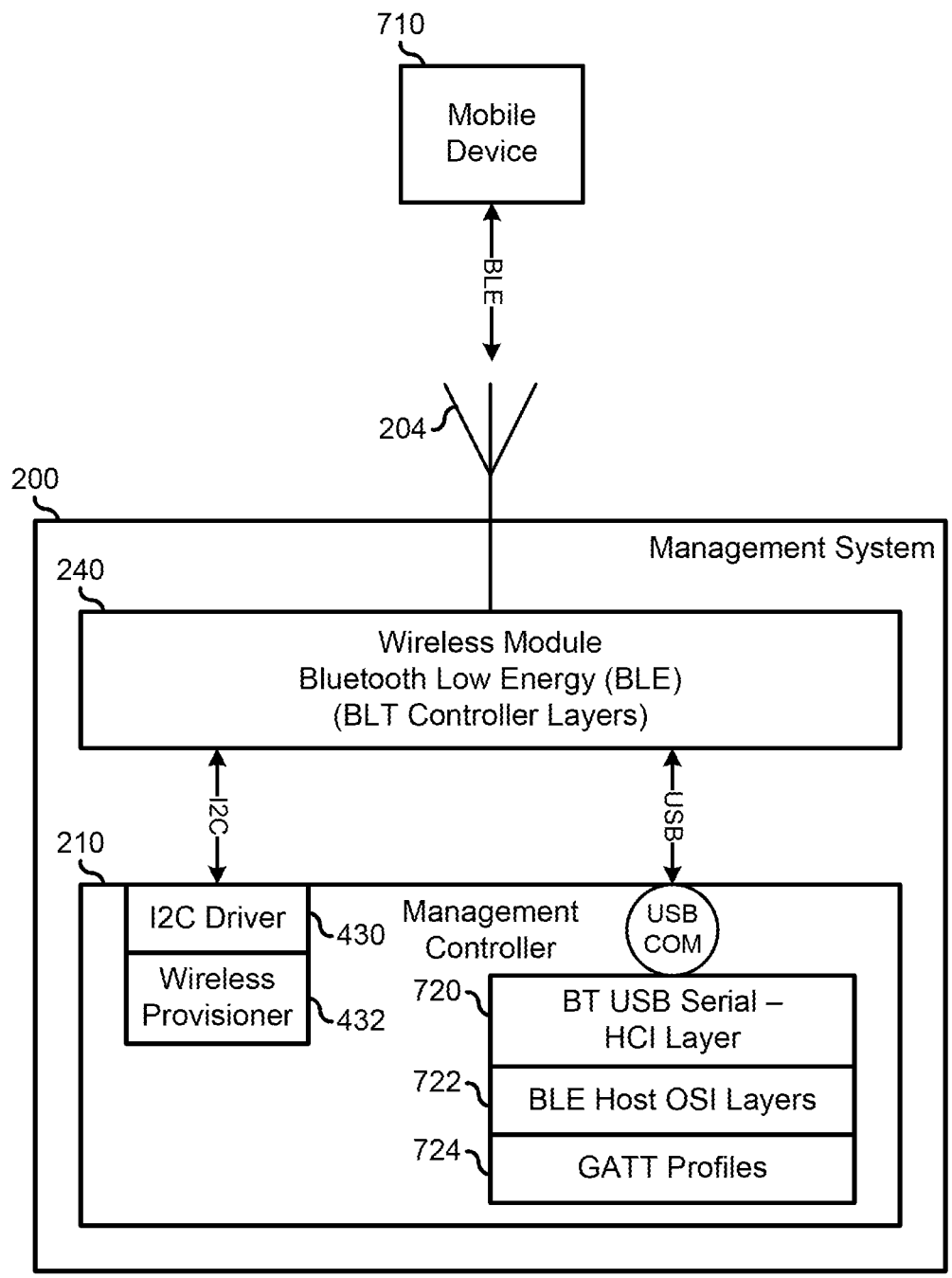
FIG. 7 is a block diagram of a wireless Bluetooth-based management network on the management system of FIG. 2.

FIG. 7 illustrates an embodiment of a wireless Bluetooth-based management network 700 on management system 200. Here, wireless management module 240 presents itself to management controller 210 as a USB COM port functionality, and the management controller is illustrated as including a Bluetooth USB—HCI layer 720, Bluetooth Low Energy (BLE) host OSI layers 722, and Bluetooth Generic Attribute Profiles (GATT) 724. Management controller 210 is also illustrated as providing I2C driver 430 and wireless provisioner 432, which tunes and controls the behavior of the wireless management module over the I2C bus. Wireless management module 240 operates independently from management controller 210 in establishing and maintaining Bluetooth-based management network 700.

In establishing Bluetooth-based management network 700, wireless management module 240 is configured as a Bluetooth controller in accordance with a Bluetooth Core Specification, and can connect a single mobile device 710 to management system 200. Management controller 210 operates to provide and maintain the BLE beacon data, content, and pass keys in wireless management module 240, and directs the wireless management module to change between operating modes, such as an advertising mode, a scanning mode, a master mode, a slave mode, or another operating mode, as needed or desired. In a particular embodiment, wireless management module 240 operates to configure the transmission power level of the Bluetooth channel, and supports RSSI and RCPI reporting on the incoming signal from mobile device 710. Further, wireless management module 240 supports blacklisting and whitelisting of specific mobile devices that request access to management system 200, such as by identifying a particular MAC address, IP address, International Mobile-station Equipment Identity (IMEI), Mobile Equipment Identifier (MEID), or other unique identifier for a mobile device.

Figure 10:
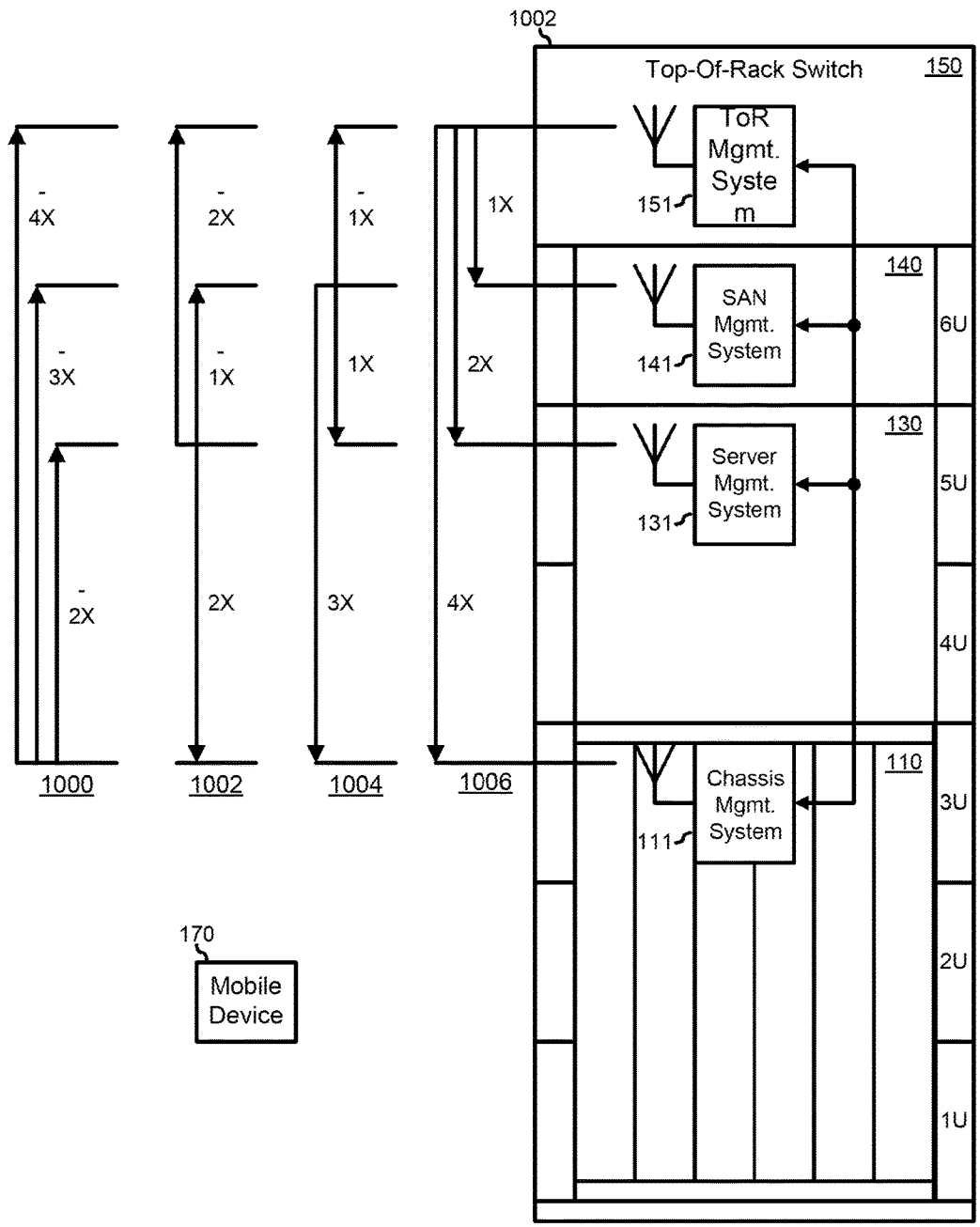
FIG. 10 is a view of the server rack of FIG. 1, and a method for aggregating communication and control of wireless end-points according to an embodiment of the present disclosure.

FIG. 10 illustrates server rack 100, including blade chassis 110, server 130, SAN 140, and ToR switch 150. Here, each of management systems 111, 131, 141, and 151 operate to connect to each of the other management systems in a way that each of the management systems determines its physical location within server rack 100. In a particular embodiment a first management system, such as chassis management system 111, is directed to issue a connection beacon at a low power setting to determine if any other management systems are within range of chassis management system 111 at the low power setting. If not, then chassis management system 111 incrementally raises the power setting until the beacon is being issued at a sufficient power level for a next closest management system, in this case server management system 131, to detect and respond to the beacon.

Chassis management system 111 then continues to incrementally raise the power setting of the beacon until a next closest management system, here SAN management system 141 detects the beacon and responds. Chassis management system 111 continues in like manner until all management systems in server rack 100 are detected, and the distance to each management system is correlated to a relative distance or position based upon the power level needed for the management systems to detect and respond to the beacon. For example, a beacon power level map 1000 for chassis management server 110 is shown where server management system 131 is two units away from the chassis management system, SAN management system 141 is three units away from the chassis management system, and ToR management system 151 is four units away from the chassis management system. Note that a "unit" here can refer to increments of the power level settings, to multiple sets of increments of the power level settings, to correlations between the power level settings and a physical distance, or another correlation to relative position, as needed or desired. Management systems 131, 141, and 151 are likewise directed to map the locations of the other management systems in server rack 100, as illustrated in beacon power level maps 1002, 1004, and 1006, respectively. In a particular embodiment, one or more of management systems 111, 131, 141, and 151 operate to detect a RSSI or a RCPI to permit the determination of the proximity between the management systems. A beacon from management systems 111, 131, 141, and 151 can include identification information for the management systems, for the respective chassis 110, server 130, SAN 140, and ToR switch 150, or other identifying information, as needed or desired.

Note that for chassis management system 111, each of management systems 131, 141, and 151 are successively farther away from the chassis management system. Likewise for ToR management system 151, each of management systems 141, 131, and 111 are successively farther away from the chassis management system. From this knowledge, chassis management system 111 and ToR management system 151 can determine that they are respective a bottom and a top endpoint. Similarly, by virtue of the fact that server management system 131 detects two devices that are the same distance away, (chassis management system 111 and ToR management system 151), the server management system can determine that it is a middle endpoint, and by virtue of the fact that SAN management system 141 detects two devices that are the same distance away, (server management system 131 and ToR management system 151), the SAN management system can determine that it is also a middle endpoint. Moreover, management systems 111, 131, 141, and 151 operate to share maps 1000, 1002, 1004, and 1006 such that the complete order of the elements of server rack 100 are known to all of the elements of the server rack. For example, in addition to issuing and responding to each other's beacons, management systems 111, 131, 141, and 151 can operate to establish wireless connections and communicate maps 1000, 1002, 1004, and 1006 to each other. In another example, management systems 111, 131, 141, and 151 can communicate beacon power level maps 1000, 1002, 1004, and 1006 to each other via management network 160.

In a particular embodiment management systems 111, 131, 141, and 151 operate to establish among themselves a wireless management network to share and aggregate information and to provide a single point of contact for mobile device 170 to interact with and control the elements of server rack 100. In a particular case, each of management systems 111, 131, 141, and 151 establishes a point-to-point wireless connection to all of the other management systems. Then, when mobile device 170 establishes a wireless connection with one of management systems 111, 131, 141, or 151, as described above, then that particular management system is designated as a network master to aggregate the information from the other management systems and to interact with and control the elements of server rack 100 via the respective point-to-point wireless connections.

In another case, after each of management systems 111, 131, 141, and 151 determine their respective beacon power level maps 1000, 1002, 1004, and 1006, one of the management systems that are determined to be a bottom or top endpoint (e.g., management systems 111 and 151) is designated as the network master to aggregate the information from the other management systems and to interact with and control the elements of server rack 100. In a particular embodiment, as the wireless network master, the designated management system establishes a point-to-point wireless connection with its next closest management system, and directs the next closest management system to establish a point-to-point wireless connection with the second next closest management system, and so forth, until a chain of point-to-point wireless connections is established between management systems 111, 131, 141, and 151. In another embodiment, as the wireless network master, the designated management system acts as an access point and establishes networked wireless connections with the other management systems. In either embodiment, when mobile device 170 establishes a wireless connection with one of management systems 111, 131, 141, or 151, as described above, then that particular management system provides an indication to the master management system, that the mobile device has established the wireless connection. Then, the master management system directs the connected management system to drop the wireless connection and reestablishes a new wireless connection directly with mobile device to aggregate the information from the other management systems and to interact with and control the elements of server rack 100.

In yet another case, one of management systems 111, 131, 141, and 151 operates as a temporary master management system to initiate beacon power level mapping, and, upon determining that it is a middle endpoint, the management system provides an indication to one of the outer management systems that the current master management system is relinquishing the role as master management system to the outer management system. The outer management system then proceeds to initiate beacon power level mapping, and the process proceeds until a top or a bottom endpoint obtains the role as master management system.

Figure 11:
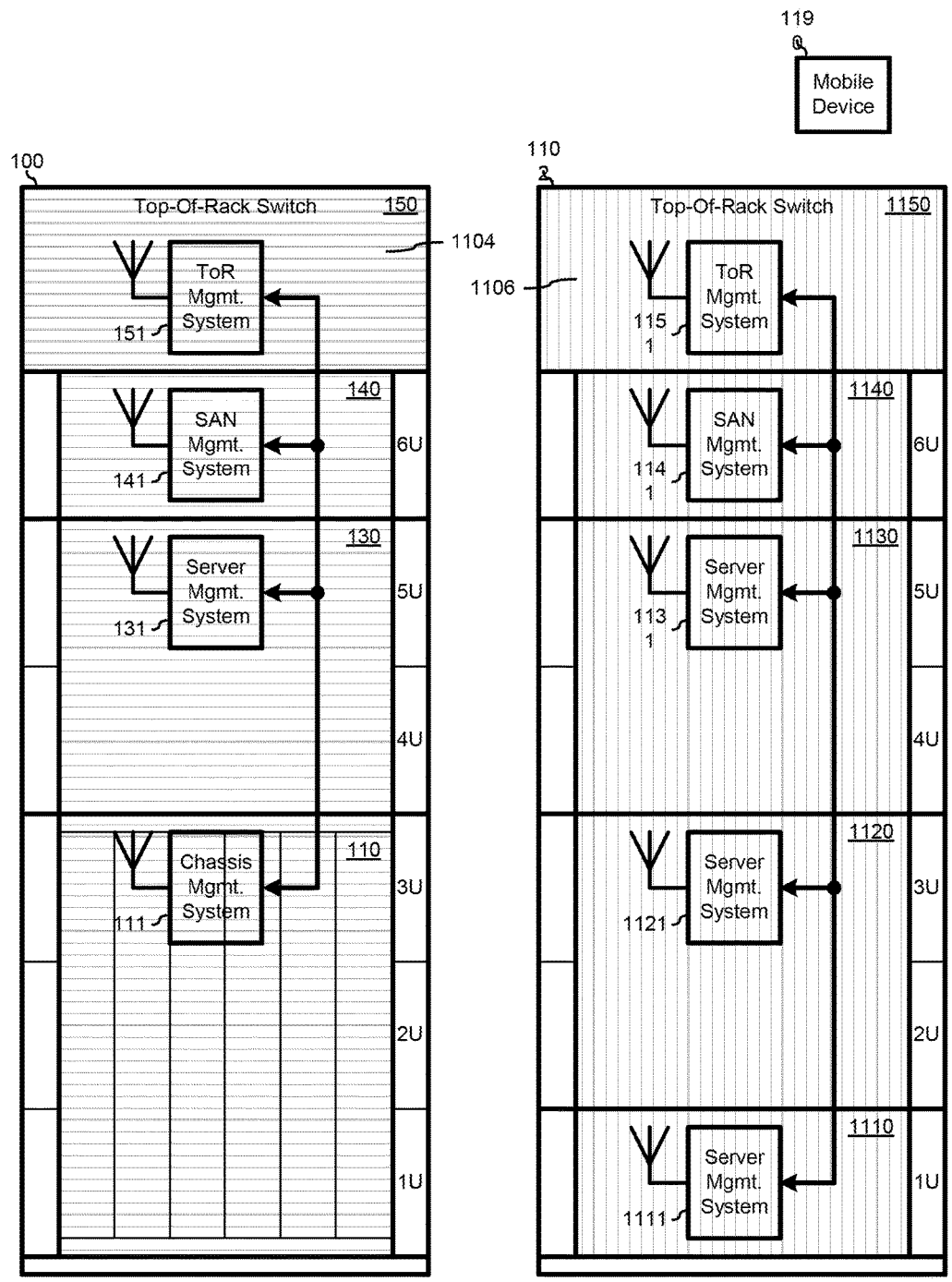
FIGS. 11-13 are views of a data center including the server rack of FIG. 1 according to various embodiments of the present disclosure.

Note that the formation of a wireless management network, as described above, related to geographically associated elements of server rack 100. That is, the wireless management network was shown as being formed based upon the fact that the elements of server rack 100 were part of the server rack, and not part of a different server rack. FIG. 11 illustrates a datacenter 1100 including server rack 100 and an additional server rack 110. Server rack 1102 includes servers 1110, 1120, and 1130 with respective management systems 1111, 1121, and 1131, a SAN 1140 with a management system 1141, and a ToR switch 1150 with a management system 1151. Here, the elements of server racks 100 and 1102 are formed into separate wireless management networks based upon which server rack includes the elements. Thus server rack 100 forms a wireless management network 1104, illustrated by the horizontal pattern, comprising chassis 110, server 130, SAN 140, and ToR switch 150, and server rack 1100 forms a wireless management network 1106, illustrated by the vertical pattern, comprising chassis servers 1110, 1120, and 1130, SAN 1140, and ToR switch 1150. In this way, a service technician tasked with maintaining a group of server racks at a particular location can access the management data and control functions for the group of server racks via a mobile device that is connected to a single master management system.

Figure 12:
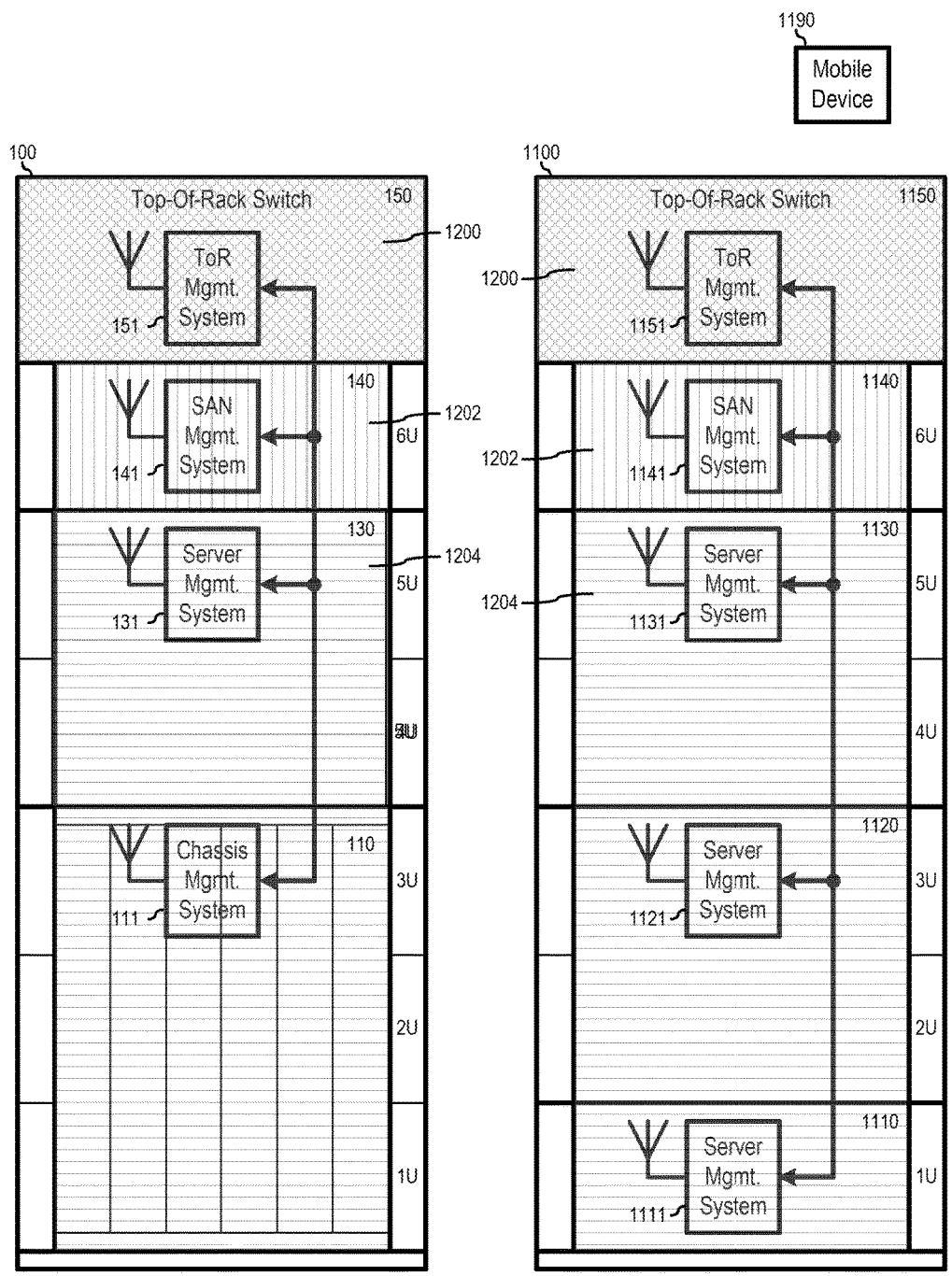

In another embodiment, the beacons provided by management systems 111, 131, 141, 151, 1111, 1121, 1131, 1141, and 1151 include information related to the function of the respective elements within the data center. For example, ToR management systems 151 and 1151 can indicate that respective ToR switches 150 and 1150 are networking devices in datacenter 1100. Here, different management networks can be formed based upon the function of the elements of datacenter 1100. FIG. 12 illustrates data center 1100 with management networks that are made up of elements that have a common function within the datacenter. Here, ToR management systems 151 and 1151 form a wireless management network 1200, as illustrated by the cross-hatch pattern, SAN management systems 141 and 1141 form a wireless management network 1202, as illustrated by the vertical pattern, and server management systems 131, 1111, 1121, and 1131 and chassis management system 151 form a wireless management system 1204, as illustrated by the horizontal pattern. In this way, a service technician tasked with maintaining a particular type of equipment in the data center can access the management data and control functions for the elements of the particular type via a mobile device that is connected to a single master management system.

Figure 13:
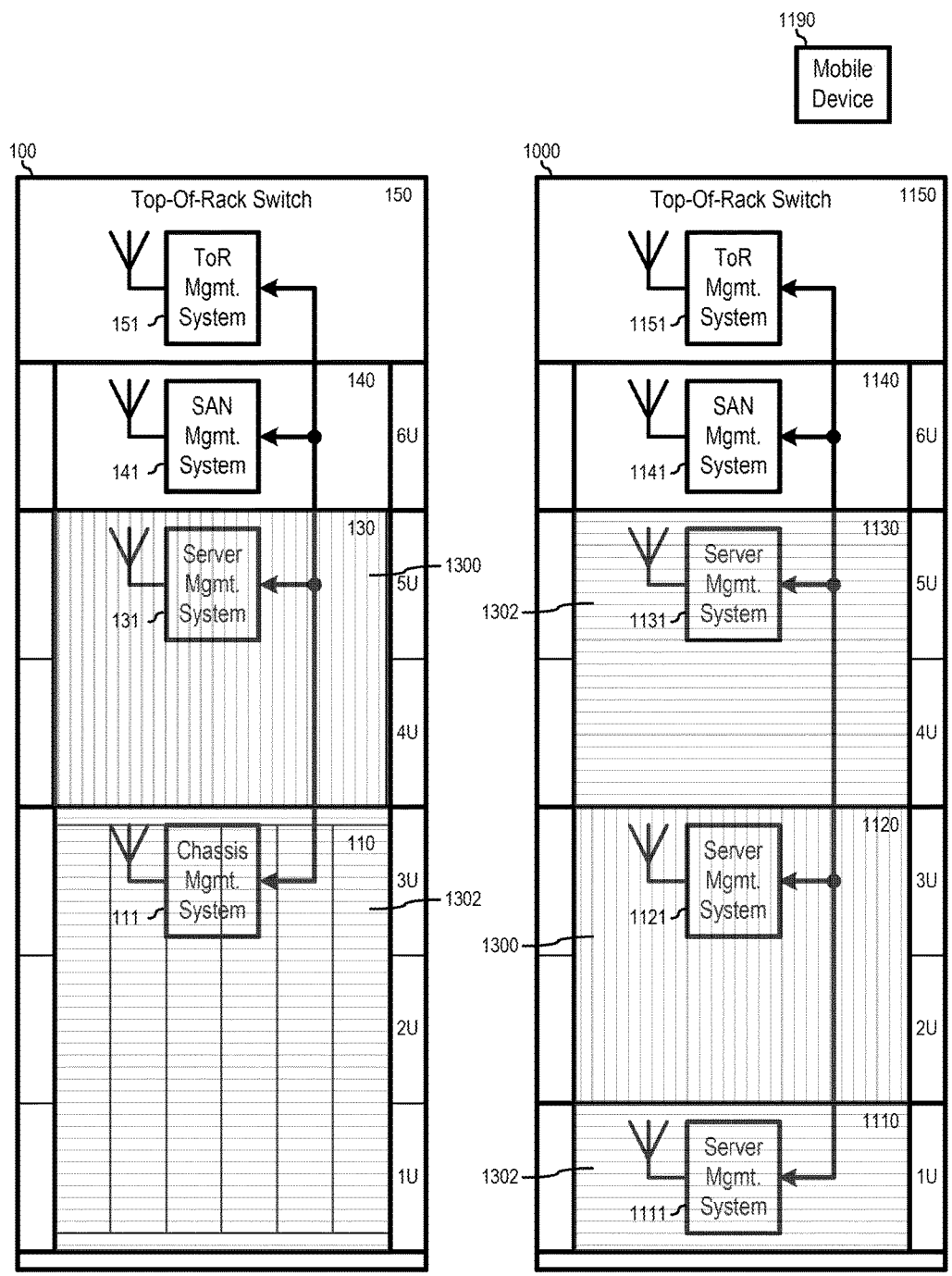

In yet another embodiment, the beacons provided by management systems 111, 131, 141, 151, 1111, 1121, 1131, 1141, and 1151 include information related to the ownership of the function of the respective elements within the data center. For example, compute functions in a server rack can be assigned to different tasks or to different clients of the datacenter. Here, different management networks can be formed based upon the ownership of the elements of the database. Thus, as illustrated in FIG. 13, data center 1100 provides management networks that are made up of elements that have a owner within the datacenter. Here, servers management systems 131 and 1121 form a wireless management network 1300, as illustrated by the vertical pattern, and chassis management system 111 and server management systems 1111 and 1131 form a wireless management network 1302, as illustrated by the horizontal pattern. In this way, a service technician associated with a particular workload or processing task owner can access the management data and control functions for the group of servers associated with the particular workload or processing task via a mobile device that is connected to a single master management system. Note that ownership, as used herein, is meant to denote control, and is not related to issues of title.

Further note that the management systems of datacenter 1100 can be members of different wireless management networks, as needed or desired. For example, while FIGS. 11-13 can be understood to each show separate and mutually exclusive wireless management networks, FIGS. 11-13 can also be understood to represent different overlapping wireless management networks, as needed or desired. Further, a management system that operates as a master management system in one wireless management network may be a slave management system in a different wireless management network.

Figure 14:
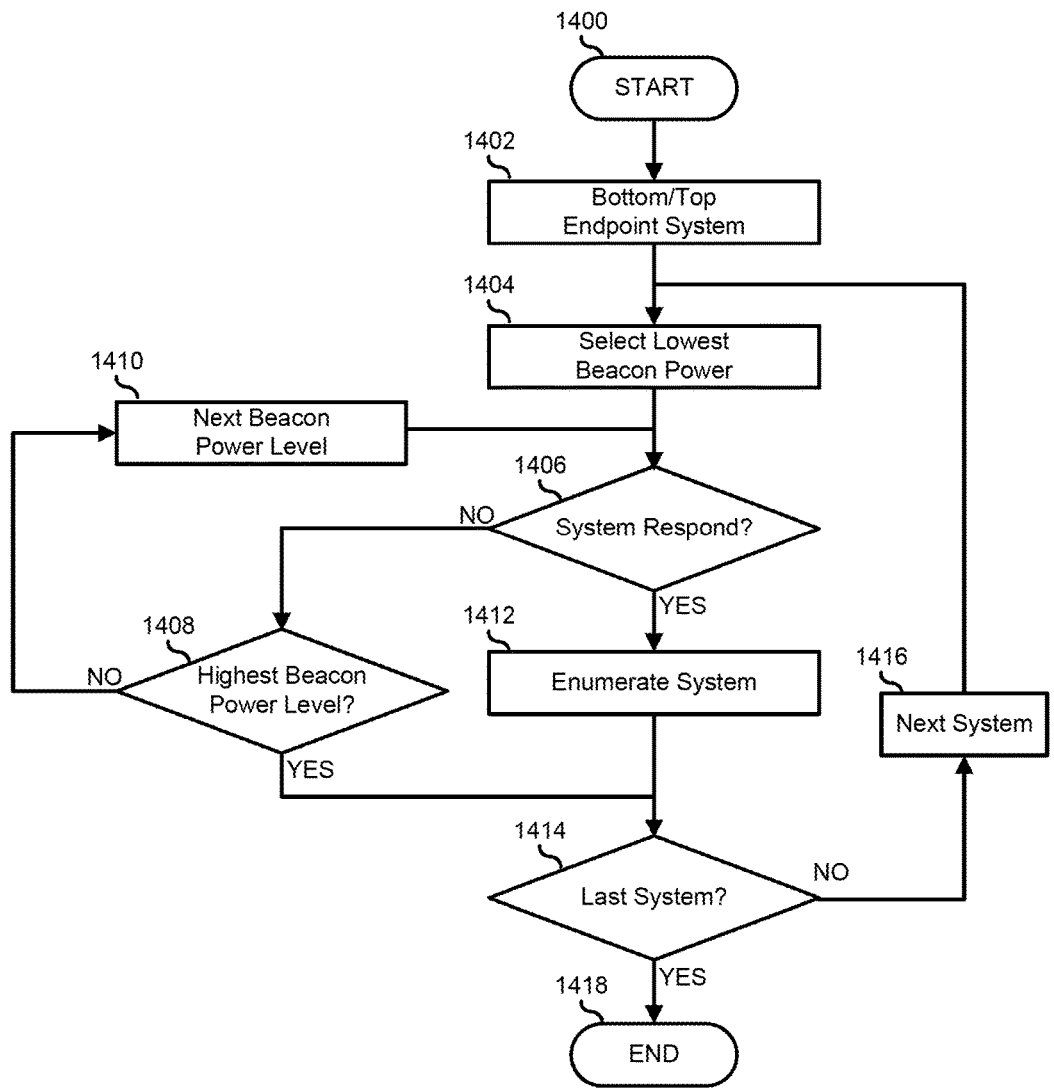
FIG. 14 is a flowchart illustrating a method for enumerating wireless end-points in a data center according to an embodiment of the present disclosure.

FIG. 14 illustrates a method for enumerating wireless end-points in a data center beginning at block 1400. A bottom or top endpoint system is selected in block 1402. The lowest beacon power setting is selected and the selected endpoint provides the beacon at the selected power setting in block 1404. A decision is made as to whether or not another system responds to the beacon in decision block 1406. If not, the "NO" branch of decision block 1406 is taken and a decision is made as to whether or not the beacon power setting is the highest beacon power setting in decision block 1408. If not, the "NO" branch of decision block 1408 is taken, the selected system selects the next higher beacon power setting in block 1410 and the method returns to decision block 1406 where a decision is made as to whether or not another system responds to the beacon. If the beacon power setting is the highest beacon power setting, the "YES" branch of decision block 1408 is taken and the method proceeds to decision block 1414, as described further, below.

Returning to decision block 1406, if another system responds to the beacon, the system is enumerated in block 1412. If the beacon power setting is the highest beacon power setting, as determined in decision block 1408, or after the responding system is enumerated in block 1412, a decision is made as to whether or not the selected system is the last system in decision block 1414. If so, the "YES" branch of decision block 1414 is taken and the method ends in block 1418. If the selected system is not the last system, the "NO" branch of decision block 1414 is taken, the next system is selected in block 1416, and the method returns to block 1404 where the lowest beacon power setting is selected and the newly selected endpoint provides the beacon at the selected power setting.

Figure 15:
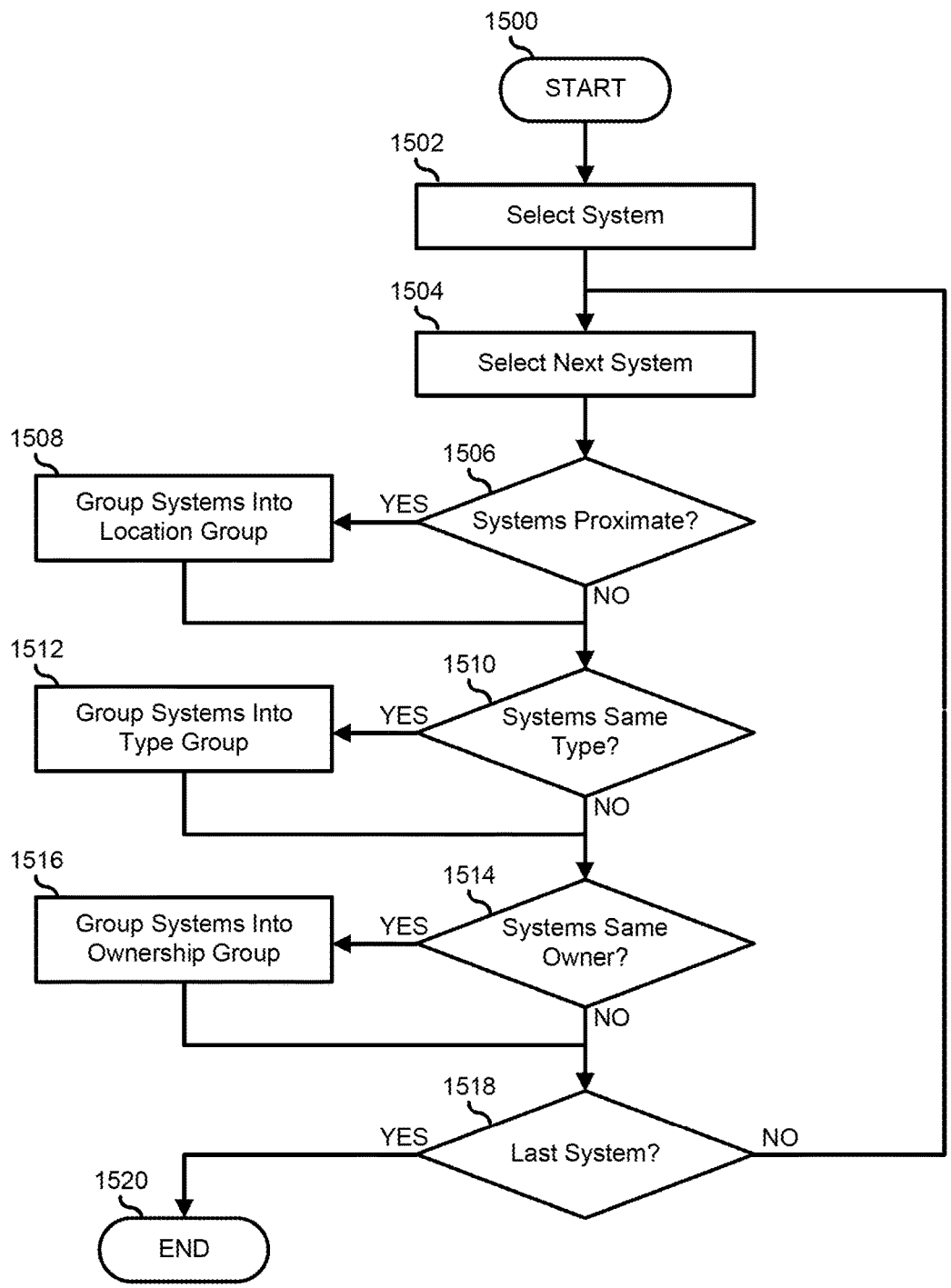
FIG. 15 is a flowchart illustrating a method for aggregating communication and control of wireless end-points in a data center according to an embodiment of the present disclosure.

FIG. 15 illustrates a method for aggregating communication and control of wireless end-points in a data center starting at block 1500. A first system is selected as a base system in a location group, a type group, and an ownership group in block 1502. A next system is selected in block 1504. A decision is made as to whether or not the first system and the next system are proximate to each other in decision block 1506. If so, the "YES" branch of decision block 1506 is taken and the next system is grouped into the location group with the first system in block 1508 and the method proceeds to decision block 1510. Also, if the first system and the next system are not proximate to each other, the "NO" branch of decision block 1506 is taken and the method proceeds to decision block 1510 where a decision is made as to whether or not the first system and the next system are of the same type.

If so, the "YES" branch of decision block 1510 is taken and the next system is grouped into the type group with the first system in block 1512 and the method proceeds to decision block 1514. Also, if the first system and the next system are not of the same type, the "NO" branch of decision block 1510 is taken and the method proceeds to decision block 1514 where a decision is made as to whether or not the first system and the next system are commonly owned. If so, the "YES" branch of decision block 1514 is taken and the next system is grouped into the ownership group with the first system in block 1516 and the method proceeds to decision block 1518. Also, if the first system and the next system are not commonly owned, the "NO" branch of decision block 1514 is taken and the method proceeds to decision block 1518 where a decision is made as to whether or not the next system is the last system. If not, the "NO" branch of decision block 1518 is taken and the method returns to block 1504 where a next system is selected. If the next system is the last system, the "YES" branch of decision block 1518 is taken and the method ends in block 1520.

Figure 8:
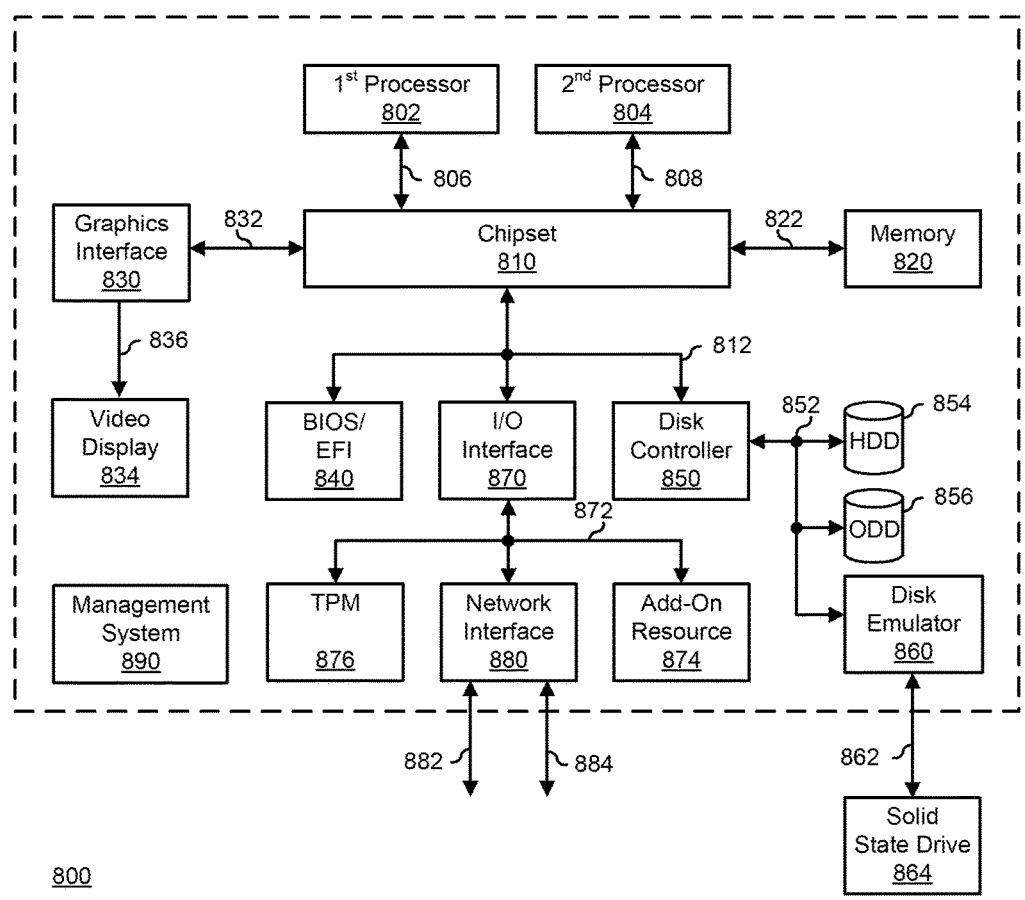
FIG. 8 is a block diagram illustrating a generalized information handling system according to an embodiment of the present disclosure.
Figure 9:
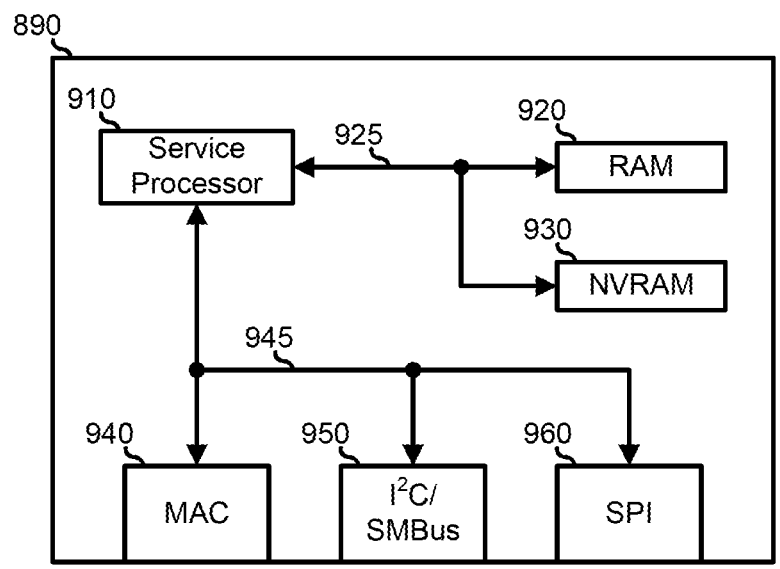
FIG. 9 is a block diagram illustrating an embodiment of a management system of the information handling system of FIG. 8.

FIG. 8 illustrates a generalized embodiment of information handling system 800. For purpose of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described above, and operates to perform one or more of the methods described above. Information handling system 800 includes a processors 802 and 804, a chipset 810, a memory 820, a graphics interface 830, include a basic input and output system/extensible firmware interface (BIOS/EFI) module 840, a disk controller 850, a disk emulator 860, an input/output (I/O) interface 870, a network interface 880, and a management system 890. Processor 802 is connected to chipset 810 via processor interface 806, and processor 804 is connected to the chipset via processor interface 808. Memory 820 is connected to chipset 810 via a memory bus 822. Graphics interface 830 is connected to chipset 810 via a graphics interface 832, and provides a video display output 836 to a video display 834. In a particular embodiment, information handling system 800 includes separate memories that are dedicated to each of processors 802 and 804 via separate memory interfaces. An example of memory 820 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 840, disk controller 850, and I/O interface 870 are connected to chipset 810 via an I/O channel 812. An example of I/O channel 812 includes a Peripheral Component Interconnect (PCI) interface, a PCI-Extended (PCI-X) interface, a high speed PCI-Express (PCIe) interface, another industry standard or proprietary communication interface, or a combination thereof. Chipset 810 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 840 includes BIOS/EFI code operable to detect resources within information handling system 800, to provide drivers for the resources, initialize the resources, and access the resources. BIOS/EFI module 840 includes code that operates to detect resources within information handling system 800, to provide drivers for the resources, to initialize the resources, and to access the resources.

Disk controller 850 includes a disk interface 852 that connects the disc controller to a hard disk drive (HDD) 854, to an optical disk drive (ODD) 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits a solid-state drive 864 to be connected to information handling system 800 via an external interface 862. An example of external interface 862 includes a USB interface, an IEEE 1394 (Firewire) interface, a proprietary interface, or a combination thereof. Alternatively, solid-state drive 864 can be disposed within information handling system 800.

I/O interface 870 includes a peripheral interface 872 that connects the I/O interface to an add-on resource 874, to a TPM 876, and to network interface 880. Peripheral interface 872 can be the same type of interface as I/O channel 812, or can be a different type of interface. As such, I/O interface 870 extends the capacity of I/O channel 812 when peripheral interface 872 and the I/O channel are of the same type, and the I/O interface translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as chipset 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management controller 890 provides for out-of-band monitoring, management, and control of the respective elements of information handling system 800, such as cooling fan speed control, power supply management, hot-swap and hot-plug management, firmware management and update management for system BIOS or UEFI, Option ROM, device firmware, and the like, or other system management and control functions as needed or desired. As such, management system 890 provides some or all of the functions and features of the management systems described herein.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A server rack, comprising:
   a first system including a processor, and a first wireless management system that manages a managed element of the first system out of band from the processor and that provides at a first time a first wireless connection beacon transmitted at a first power level and that provides at a second time a second wireless connection beacon at a second power level, the second power level being higher than the first power level; and
   a second system including a second wireless management system that receives the second wireless connection beacon at the second time and that provides a first indication to the first wireless management system that the second wireless management system received the second wireless connection beacon;
   wherein the first wireless management system further determines a first distance between the first system and the second system based upon the first indication.

2. The server rack of claim 1, wherein the first location is further determined based on the second power level.

3. The server rack of claim 1, wherein the first wireless management system further provides at a third time a third wireless connection beacon at a third power level, the third power level being higher than the second power level, the server rack further comprising:
a third system including a third wireless management system that receives the third wireless connection beacon at the third time and that provides a second indication to the first wireless management system that the third wireless management system received the second wireless connection beacon;
wherein the first wireless management system further determines a second distance between the first system and the third system based upon the second indication.

4. The server rack of claim 1, wherein the first wireless management system further groups the first system and the second system into a group based upon the second system being located at the first location.

5. The server rack of claim 1, wherein the first system and the second system are a same type of system.

6. The server rack of claim 5, wherein the first system further groups the first system and the second system into a group based upon the first system and the second system being the same type of system.

7. The server rack of claim 1, wherein the first system and the second system are configured to provide a common processing function.

8. The server rack of claim 7, wherein the first system further groups the first system and the second system into a group based upon the first system and the second system being configured to provide the common processing function.

9. A method, comprising:
managing, by a first wireless management system, a managed element of a first system that includes the first wireless management system, wherein the managed element is managed out of band from a processor of the first system;
providing at a first time, by the first wireless management system, a first wireless connection beacon at a first power level;
providing at a second time, by the first wireless management system, a second wireless connection beacon at a second power level, the second power level being higher than the first power level;
receiving, by a second wireless management system, the second wireless connection beacon at the second time;
providing, by the second wireless management system, a first indication to the first wireless management system that the second wireless management system received the second wireless connection beacon; and
determining, by the first wireless management system, a first distance between the first system and a second system based upon the first indication, wherein the second system includes the second wireless management system.

10. The method of claim 9, wherein the first location is further determined based on the first power level.

11. The method of claim 9, further comprising:
providing at a third time, by the first wireless management system, a third wireless connection beacon at a third power level, the third power level being higher than the second power level;
receiving, by a third wireless management system, the third wireless connection beacon at the third time;
providing, by the third wireless management system, a second indication to the first wireless management system that the third wireless management system received the second wireless connection beacon; and
determining, by the first wireless management system, a second distance between the first system and a third system based upon the second indication, wherein the third system includes the third wireless management system.

12. The method of claim 9, further comprising:
grouping, by the first wireless management system, the first system and the second system into a group based upon the second system being located at the first location.

13. The method of claim 9, wherein the first system and the second system are a same type of system.

14. The method of claim 13, further comprising:
grouping, by the first wireless management system, the first system and the second system into a group based upon the first system and the second system being the same type of system.

15. The method of claim 9, wherein the first system and the second system are configured to provide a common processing function.

16. The method of claim 15, further comprising:
grouping, by the first wireless management system, the first system and the second system into a group based upon the first system and the second system being configured to provide the common processing function.

17. A non-transitory computer-readable medium including code for performing a method, the method comprising:
managing, by a first wireless management system, a managed element of a first system that includes the first wireless management system, wherein the managed element is managed out of band from a processor of the first system;
providing at a first time, by the first wireless management system, a first wireless connection beacon at a first power level;
providing at a second time, by the first wireless management system a second wireless connection beacon at a second power level, the second power level being higher than the first power level;
receiving, by a second wireless management system, the second wireless connection beacon at the second time;
providing, by the second wireless management system, a first indication to the first wireless management system that the second wireless management system received the second wireless connection beacon; and
determining, by the first wireless management system, a first distance between the first system and a second system based upon the first indication, wherein the second system includes the second wireless management system.

18. The computer-readable medium of claim 17, wherein the first location is further determined based on the first power level.

* * * * *